United States Patent Office 3,600,203
Patented Aug. 17, 1971

3,600,203
FLUIDIZED MOLDING MATERIAL FOR MANUFACTURING CORES AND MOLDS AND A METHOD THEREFOR
Adolfo Aldera, Turin, Italy, assignor to Centro Sperimentale Metallurgico Società per Azioni, Rome, Italy
No Drawing. Continuation-in-part of application Ser. No. 674,003, Oct. 9, 1967. This application Sept. 5, 1969, Ser. No. 855,767
Int. Cl. B28b 7/28
U.S. Cl. 106—38.3                                          8 Claims

ABSTRACT OF THE DISCLOSURE

The fluidized molding material contains sand, an aluminous cement or a mixture of aluminous cement with other cements, a lithium salt which is an accelerating agent for the setting of the aluminous cement, a tensioactive agent with a foaming action and water and is prepared by mixing these components. The setting time of this molding material may be varied without substantial change in the mechanical strength of the cast product by varying the proportion of lithium salt.

This application is a continuation-in-part of my copending U.S. application Ser. No. 674,003 filed Oct. 9, 1967, now abandoned.

BACKGROUND OF INVENTION

The present invention relates to molding materials used in the foundry industry for manufacturing cores and molds. This invention is particularly directed to molding operations involving medium and large cores and molds; however, it may also be used for cores and molds of small size, especially when the production thereof is limited to single pieces or to a small series.

The fluidized material of the present invention belongs to the class of core sands, however, since this fluidized material may also be used for molds, it will be referred to herein by the more general term of "molding material." As a matter of fact, the difference in use between the molding earth, or sand and core sand is no longer very clear. Recent developments in molding techniques, such as the use of patterns constituted entirely by core boxes, and molding at full molds with a gasifiable pattern, have resulted in the increasing use of core sands, even for obtaining the outer surface of castings.

Molding work involving medium and large moldings, in its broader aspect, comprises not only the filling and tamping of the molding material into the core boxes or against the pattern, but also other operations as the preparation of the reinforced gaggers, the stripping, fixing, painting, drying and transport of the moldings. The nature of all of these operations is obviously defined and conditioned mainly by the technological characteristics of the molding material, that is, in the present case, of the core sand.

Until about twenty years ago, the foundries for medium and large castings were provided only with the conventional core sands agglomerated with linseed oil or similar products. In some cases natural argillaceous earths corrected or reinforced or Portland cement sands were used.

The first two mentioned methods had in common the difficulty and high cost of the molding work and the danger of breaks or deformations during the transport and drying. The third method required smaller molding work and could avoid the drying operation, but had the inconvenience of an excessive setting time and some technological characteristics which were unsatisfactory for certain uses.

About 1952, molding with self-setting sand was introduced, that is, sand agglomerated with unsaturated oils which had been treated in a particular way. The advantages of this material included a great reduction in the work of tamping, the achievement of remarkable dimensional accuracy, and the reduction or avoidance of firing gaggers and supports.

In the years 1955–56, the sodium silicate $+CO_2$ process was developed, by means of which a substantially immediate setting is obtained by gasification and by means of which the drying operation is avoided.

Then in 1959 the use of self-setting sands agglomerated with furanic resins became known, which is a remarkable improvement with respect to the self-setting oils and which also entirely avoids the step of drying.

Finally, in 1963 an interesting molding process involving sodium silicate plus ferrosilicon was developed. In this process the gasification by $CO_2$ is replaced by self-setting between sodium silicate and silicone as a result of a chemical reaction; in this case too, drying is not necessary. The problems of the self-setting and direct use of the molding without drying being substantially solved, the next step to be made was the entire removal of the work of tamping the material. This latter problem was solved by using fluidized sands which are poured or cast directly into the core box or onto the pattern. Although molding mixtures prepared in the fluid phase and used for simple casting have been known for a long time, such mixtures, with a base of organic esters of the silicic acid, have found only a limited use for precision moldings due to technological deficiencies and also for economic reasons.

Recently however, a method was suggested which employs a mixture of fluidized sand with tensioactive agents; the mixture is self-setting as a result of the chemical reaction between sodium silicate and bicalcium silicate and the drying step may be avoided or reduced to a minimum. Unfortunately the strength characteristics of this material are poor and actually are closer to those of dried molding earth, rather than those of core sand. Other disadvantages of this material are the difficulty of finding industrial products containing bicalcium silicate in high and constant percentages and the difficulty of removing earth from the castings due to the presence of sodium silicate.

Numerous materials have been used as setting accelerators for molding compositions. However, most of these materials have serious disadvantages. That is many of the accelerating agents cause a decrease in the strength of the molded material and/or cause the material to shrink during molding so that dimensional accuracy in the final product is difficult or impossible to obtain.

SUMMARY OF THE INVENTION

It is an object of this invention to provide a fluidized and self-setting molding material which has all of the advantages provided by the above mentioned known materials, and which in addition, avoids many of the disadvantages present in each.

Another object of this invention is to provide a particular economical fluidized self-setting molding material by the use of readily available and relatively low cost raw materials. It is also an object of this invention to provide an economical process for preparing fluidized self-starting molding materials.

Still another object of this invention is the provision of a fluidized molding material which has the following advantages: complete avoidance of tamping, a method or preparation which is simple and economical, capability of being transported by pneumatic means, avoidance of any product which is acid, alkaline or toxic, avoidance of defects in casting due to non-homogeneous tamping of the molding material, high dimensional accuracy, and the capability of being used directly without drying, and also of use even in a non-fluid phase such as a layer of sample sand.

A further object of the invention is the provision of a large range of materials prepared from a single base which has independently varying characteristics of strength and rate of setting.

Another important object of the present invention is the provision of an initially fluid, smooth mixture which has advantageous characteristics when cast including a desirable setting time and good mechanical strength.

The fluidized and self-setting molding material of the invention, comprises a filling material constituted of sand, a hydraulic binder which includes aluminous cement, a lithium salt which is an accelerating agent for the aluminous cement, a tensioactive agent with a foaming action, and water. It has been discovered that by varying the proportion of lithium salt, the setting time may be varied without a substantial change in the mechanical characteristics of the cast product.

DESCRIPTION OF THE PREFERRED EMBODIMENTS

The amounts of sand, cement and tensioactive agent in percentages by weight, based on the total weight of these three components of the molding material of this invention are as follows: the amount of sand is comprised between 60 and 97%, preferably 86.51–91.36%; the amount of hydraulic binder is between 3 and 40% preferably 13.33 to 8.61% and the amount of the tensioactive agent with foaming action between 0.02 and 2%; 0.16 to 0.03% the amount of water used with this mixture is between 50 and 100% by weight, preferably 83.33 to 87.50% based on the weight of the hydraulic binder.

In the molding material of the present invention, the hydraulic binder is comprised of aluminous cement or a mixture of aluminous cement and other suitable cement, mixtures of aluminous cement, slag and/or blast furnace cement also may be employed. Slag and/or blast furnace cement may be used for reasons of economy and to maintain the total quantity of binder in the molding material constant, so as to maintain the characteristics of permeability, moisture and fluidity substantially unchanged. However, in the present composition at least 60% by weight of the hydraulic binder, i.e. cement is aluminous cement and more preferably at least 70% by weight of the cement is aluminous cement. Aluminous cement, as is well known in the art, refers to hydraulic cement wherein the active ingredient is calcium aluminate. Such cement usually contains about 40% by weight of alumina.

Generally, the substitution of less expensive cement for part of the aluminous amount is made in the case of backing sands.

The accelerating agent, which according to the present invention is a lithium salt and preferably lithium chloride, is used in a weight percentage lower than 3% by weight based on the weight of the aluminous cement. Preferably lithium chloride is used in an amount of 0.1 to 0.5% and most preferably in an amount of 0.15 to 0.35% by weight based on the weight of aluminous cement. Further, according to this invention, by varying the amount of lithium chloride within these proportions, the setting time of the cement is also varied.

The lithium salt may also be helped in its function of accelerating the self-setting action of the binder by calcium sulfate. Calcium sulfate used as a coaccelerating agent may be in any form, and is preferably used in an amount of comprised between 5 and 35% of the weight of the total cement used.

Particularly suitable tensioactive agents or surface active agents having a foaming action, include both the anionic tensioactive agents, such as secondary alkyl sulphates and sulphates or alkylarylic sulphonates, and the non-ionic tensioactive agents, such as ethylenic polyglycols and the like.

The secondary alkyl sulphates are of the type:

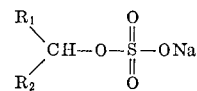

wherein $R_1$ and $R_2$ are alkyl groups, particularly wherein one alkyl group is a relatively long chain alkyl and one is a relatively short chain group, such as alkyl groups containing an average of 17 and 8 carbon atoms respectively.

The alkylarylic sulphonates are of the type:

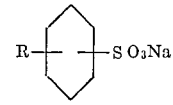

wherein R is an alkyl group, preferably a straight aliphatic chain with 5 to 8 carbon atoms.

Ethylenic polyglycols or polyoxyethylene compounds include for example, compounds formed by the condensation of ethylene oxide and of octylphenol i.e. 2,2,3,3-tetramethylbutyl-p-phenol.

The tensioactive agents, are generally interchangeable, i.e. any type may be used in this invention; further a single tensioactive substance or a mixture of two or more tensioactive substances may be used. For example an anionic tensioactive agent can be used together with a nonionic tensioactive agent in respective proportions of 1:2. However, when the present molding composition is used for complicated patterns and core boxes wherein adhesiveness is difficult or generally impossible, an ethylene polyglycol type surface active agent is preferred.

The tensioactive agent is used in an amount of about 0.02 to 2% by weight based on the weight of cement and sand, more preferably from about 0.034 to 0.4% by weight.

It has been found that when the tensioactive agent is used in a quantity lower than 0.2%, by weight, that is, from about 0.02 to less than 0.2% by weight, based on the total weight of the mixture of cement, sand and tensioactive agent, it is preferable to use water in a quantity near the stated lower limit of 50% by weight based on the weight of the cement.

The method for preparing the molding material according to the invention involves mixing all of the ingredients thoroughly. No special mixing equipment is needed to prepare the molding material and any commonly used mixer may be employed. In a particular embodiment of this invention, the mixing of the components of the molding material is performed in two steps; in the first step, a part or the whole quantity of sand, water, tensioactive material and the accelerating agent are mixed, to yield a fluid mixture which is stable and remains substantially unchanged for a long period of time. When it is desired to use the molding material, the given quantity of cement and the missing fractions of each of the remaining components are added.

The present molding composition has highly desirable characteristics. The initial composition is fluid and very smooth. After casting, the product has sufficient cohesion after about 40 minutes, depending of course on the proportion of lithium used, that the pattern may be removed from the mold, and after about 8–10 hours, the mechanical strength of the cast product is sufficient for the mold to bear the weight of melted metal.

Other objects, advantages, and characteristics of the invention will be apparent from the following examples which are given by way of illustration only. In the examples all percentages are by weight; and the percentages of sand, cement and tensioactive agent are based on a total of 100 parts by weight of these ingredients while the percentage of water is based on the weight of cement and the percent of accelerating agent is based on the weight of aluminous cement.

EXAMPLE 1

The following materials were mixed in the amounts indicated.

Sand: 89.7% parts by weight
Hydraulic binder consisting of a mixture of aluminous and slag cement in various ratios as set forth below: 10% by weight
Tensioactive agent, Teepol, a sodium salt of secondary alkyl sulfates contained in a solution of about 34% concentration: 0.3% by weight
Water: 70% by weight, based on the weight of the hydraulic binder
Lithium chloride: 0.25% by weight, based on weight of the aluminous cement.

Each of the liquid mixtures thus obtained was poured into a core box so as to obtain cylinders of the same size The time required for each of the mixtures to set was determined by successive measurements effected by a penetrometer. The values of the resistance to the compression were determined by measurements, as defined through a usual press. The results of these determinations of molding material containing various proportions of aluminous and slag cement is as follows.

Case 1

Aluminous cement—10%
Slag cement—0%
Compression resistance—40 kg./cm.$^2$
Self-setting time—1 hour

Case 2

Aluminous cement—8%
Slag cement—2%
Compression resistance—31 kg./cm.$^2$
Self-setting time—1 hour and 20 minutes.

Case 3

Aluminous cement—4%
Slag cement—6%
Compression resistance—14 kg./cm.$^2$
Self-setting time—1 hour and 45 minutes.

It is clear that the self-setting time considered as the minimum time of permanence in the molding equipment, varies within narrow limits which may be controlled in the three above cases, while the material strength varied when the composition of the cement varies. It should be noted that Case 3, having a proportion of aluminous cement outside that of the present invention, has been included for purposes of comparison. The composition of Case 3 when molded has a low compression resistance, in comparison to the compositions of the present invention which have been illustrated in Cases 1 and 2.

EXAMPLE 2

The percentage of the components of the molding material, except for the accelerating additive, is that shown in Case 2 of the preceding example.

According to the percentage of accelerating additive, the self-setting times and strengths of the molding material are the following:

Case 1

Without lithium chloride
Resistance to compression—34 kg./cm.$^2$
Self-setting time—10 hours

Case 2

Lithium chloride 0.15% of the aluminous cement
Resistance to compression—30 kg./cm.$^2$
Self-setting time—2.30 hours

Case 3

Lithium chloride—0.35% of the aluminous cement
Break load—32 kg./cm.$^2$
Self-setting time—50 minutes It is evident that the resistance to compression, which is the function of the hydraulic binder composition i.e. cement composition, has not substantially changed in the above three cases, however the time necessary for the molding material to set has varied according to the percentage of lithium chloride.

From Examples 1 and 2 it may be seen that the self-setting time and the strength of compression may be selected within high limits, independently of each other, with unchanged characteristics of fluidity, moisture and permeability of the mixture. This is also confirmed by the following example.

EXAMPLE 3

The following materials were mixed in the amounts indicated.

Sand: 88.65%
Hydraulic binder (formed by a mixture of aluminous cement 7% and blast furnace cement 4%): 11%
Tensioactive agent, Teepol: 0.35%
Water: 80%
Lithium chloride: 0.35% based on the aluminous cement
Calcium sulfate: 25% based on the weight of cement The cast material had the following characteristics:

Strength to the compression—22 kg./cm.$^2$
Self-setting time—45 minutes

According to the amount of aluminous cement contained in the hydraulic binder, it is possible to obtain various values of the strength of the molding material, and by keeping the percentages of calcium sulfate and lithium chloride constant, the time necessary for the self-setting remains practically constant.

EXAMPLE 4

The following materials were mixed in the indicated proportions

Sand: 89.97%
Aluminous cement: 10.00%
Non-ionic tensioactive agent, Nonidet (a surface active substance formed by the condensation of 9 molecules of ethylene oxide and octylphenol): 0.35%
Lithium chloride (percent with respect to the cement only): 0.20%

The cast composition had the following characteristics.

Self-setting time: 1 hour
Compression resistance: 38 kg./cm.$^2$

EXAMPLE 5

This example illustrates the two-step process of this invention.

The components used in this process are those defined in Example 1, Case 1, however, the mixing occurs in two steps.

In the first step are mixed:

89.7 parts by weight of sand
0.3 parts by weight of the tensioactive agent, Teepol
6 parts by weight of water (equal to 60% by weight of the aluminous cement to be successively added in the second step)

This mixture may be maintained for a substantially unlimited period of time; further, it may be carried, for instance by pumping, from a single zone of preparation to the various points of use, where such a mixture shall be added, in a second step, with the following components:

10 parts by weight of aluminous cement
1 part by weight of water, in which a quantity of lithium chloride corresponding to 0.25% of the quantity of the aluminous cement used had been previous dissolved.

The fluid mixture so obtained may be immediately used for obtaining the molds or cores requested at each time.

Because the process of this invention may be divided into two steps, it is possible to increase the quantity of an accelerating agent without the danger of having the setting start too soon.

Thus a fluidized self-setting molding composition is provided wherein the setting time may be varied within rather wide limits i.e. from about 5 hours to only 20 minutes by varying the quantity of lithium salt used, and without substantially changing the mechanical strength of the cast product may be varied by varying the proportion of aluminous cement employed as the hydraulic binder.

What I claim and desire to secure by Letters Patent is:

1. In a fluidized and self-setting molding material, of the type containing a filling material comprising sand in an amount of about 60–97% by weight, a self-setting hydraulic binder in an amount of 3–40% by weight, said binder containing at least 60% by weight of aluminous cement, a surface active agent with a foaming action and water in an amount of 50 to 100% based on the weight of said binder, the improvement which comprises including in said molding material lithium chloride in an amount of 0.1 to 0.5% by weight based on the weight of aluminous cement whereby said lithium chloride accelerates the self-setting action of said cement.

2. A molding material according to claim 1 in which said surface active agent is present in an amount of about 0.02 to 2% by weight based on the weight of the mixture of sand, hydraulic binder and surface active agent.

3. A molding material according to claim 1 in which said hydraulic binder is comprised solely of aluminous cement.

4. A molding material according to claim 1 wherein said molding material further comprises calcium sulfate in an amount of 5 to 35% by weight based on the weight of said hydraulic binder said calcium sulfate acting as a co-accelerating agent with said lithium chloride.

5. A molding material according to claim 1 in which said hydraulic binder contains about 60 to 100%, by weight of aluminous cement, and from about 0 to 40% by weight of a cement selected from at least one member of the group consisting of slag and blast furnace cement.

6. In a method for preparing a fluidized self-setting molding material which comprises mixing sand in an amount of 3–40% by weight, a surface active agent in an amount of about 0.02 to 2% by weight based on the weight of the mixture and water in an amount of about 50–100% based on the weight of said hydraulic binder, the improvement which comprises mixing lithium chloride in an amount of about 0.1 to 0.5% by weight based on the weight of said aluminous cement with said sand, said binder containing aluminous cement, said surface active agent and water, whereby said lithium chloride accelerates the self-setting action of the aluminous cement.

7. A method according to claim 6 in which the setting time of the aluminous cement is varied by varying the amount of lithium chloride mixed with said sand, binder, surface active agent and water.

8. A method for preparing molding material according to claim 6 wherein said mixing is carried out in two steps, wherein the first step comprises mixing at least part of the quantity of said sand, sand water, said lithium chloride and said tensioactive agent to obtain a fluid mixture which mixture is stable for a long period of time and wherein said second step comprises adding to said fluid mixture just prior to use said hydraulic binder and any remaining part of said sand, said water and said tensioactive agent.

References Cited
UNITED STATES PATENTS

| | | |
|---|---|---|
| 1,924,028 | 8/1933 | Durand. |
| 2,081,558 | 5/1937 | Prange. |
| 2,860,060 | 11/1958 | Benedict et al. _____ 106—314X |
| 2,880,100 | 3/1959 | Ulfstedt. |
| 2,911,311 | 11/1959 | Feagin et al. |
| 3,196,505 | 7/1965 | Moren. |
| 3,210,207 | 10/1965 | Dodson et al. _____ 106—315X |
| 3,232,777 | 2/1966 | Bush. |
| 3,285,756 | 11/1966 | Moren. |
| 3,373,048 | 3/1968 | Angstadt et al. _____ 106—315X |

LORENZO B. HAYES, Primary Examiner

U.S. Cl. X.R.

106—38.35, 38.9, 104